US010333979B1

(12) United States Patent
Stickle et al.

(10) Patent No.: US 10,333,979 B1
(45) Date of Patent: Jun. 25, 2019

(54) MULTI-TENANT NETWORK DATA VALIDATION SERVICE

(71) Applicant: Amazon Technologies, Inc., Reno, NV (US)

(72) Inventors: Thomas Charles Stickle, Saint James, NY (US); Thomas Eugene Laszewski, Hampton, NH (US); Miles Julian Ward, Santa Barbara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/301,040

(22) Filed: Jun. 10, 2014

(51) Int. Cl.
*H04L 29/06* (2006.01)

(52) U.S. Cl.
CPC .................... *H04L 63/20* (2013.01)

(58) Field of Classification Search
CPC ............. H04L 63/0815; H04L 63/0884; H04L 63/1441; G06F 17/30528; G06F 17/30896; G06F 17/30477; G06F 21/554; G06F 21/6218; H04N 1/2166; H04N 2201/3285
USPC .................................................. 715/1; 726/1
See application file for complete search history.

(56) References Cited

U.S. PATENT DOCUMENTS

| 2005/0022115 | A1* | 1/2005 | Baumgartner | G06F 17/30867 715/205 |
| 2010/0005443 | A1* | 1/2010 | Kwok | G06Q 10/10 717/100 |
| 2011/0277027 | A1* | 11/2011 | Hayton | H04L 63/0815 726/8 |
| 2012/0331524 | A1* | 12/2012 | Mower | H04L 67/025 726/3 |
| 2013/0205189 | A1* | 8/2013 | DiPierro | G06F 3/0483 715/224 |
| 2013/0238641 | A1* | 9/2013 | Mandelstein | G06F 17/303 707/756 |

* cited by examiner

Primary Examiner — Ashokkumar B Patel
Assistant Examiner — William B Jones
(74) Attorney, Agent, or Firm — Klarquist Sparkman, LLP (57) ABSTRACT

A method of validating data in a multi-tenant network of a service provider may include storing a page in a network storage, where the page is associated with a tenant of the service provider. In response to a page request, the page may be served from the network storage to a computing device communicatively coupled to the multi-tenant network. The page in the network storage may be independently addressable using a uniform resource locator (URL). Data entered in at least one data field within the served page may be received. The received data may be validated by a validation service of the service provider, using a plurality of validation rules associated with the tenant. At least a portion of the plurality of validation rules may be based on the page stored in the network storage. Upon successful validation, the received data may be stored within the multi-tenant network.

19 Claims, 9 Drawing Sheets

MULTI-TENANT NETWORK DATA VALIDATION SERVICE

BACKGROUND

Cloud computing is the use of computing resources (hardware and software) that are available in a remote location and accessible over a network, such as the Internet. Users are able to buy these computing resources (including storage and computing power) as a utility on demand. Cloud computing entrusts remote services with a user's data, software and computation. In a computing environment with many computing devices, such as a virtual server or cloud computing environment with many server computers, the use of computing resources can provide a number of advantages including cost advantages and/or the ability to adapt rapidly to changing computing resource needs.

An important consideration for private enterprise networks in connection with using the expanding cloud computing resources is the validation of data and the number of computing resources dedicated to such data validation. For example, without validation protection, a user/hacker may attempt a Structured Query Language (SQL) injection attack by placing SQL instructions into fields that will be sent to the database. If such attack is successful, the user/hacker can trick the database into executing malicious code or logic, such as a deletion or modification of data.

DETAILED DESCRIPTION

Network architecture for building web scale applications may use a 3-tiered model, which includes a web server and an application (or "app") server that process logic in front of a "data layer," such as middleware or a database. In a large scale web application, the app servers may represent 20-30% of the servers in the architecture. The app servers are used to perform data validation on the server side, which provides a layer of protection between an outside network and a data resource, such as a complex relational database, inside the network architecture. The server side validation layer can be used to validate the fields (e.g., ensure correct string length, no SQL instructions, and so forth). In an example multi-tenant cloud environment, the concept of the "data layer" is changing to include cloud services, such as NoSQL databases, object stores, and queuing services.

Systems and methods for a multi-tenant network validation service are disclosed, which may be used to reduce the use of web and application servers for validating data in a network environment. More specifically, pages (e.g., web-based pages, application-based pages, or other tenant-created documents) containing various types of script (e.g., html, JavaScript, etc.) may be served to a user (e.g., a client of the tenant) from a storage service within the multi-tenant network. After the user enters data in the page, the script within the page may be used to communicate the data back to the multi-tenant network for storage in a database. The validation service may be used to proxy database store requests and validate the received data prior to storing it in the database. Additionally, the same page that was served to the user may be used as input to the validation service for purposes of, e.g., parsing the page script and creating (or updating) validation rules for validating the received data.

As used herein, the terms "virtual machine," "virtual machine instance," and "instance" are interchangeable. A virtual machine image contains an operating system (e.g., Linux) and other data needed to launch a virtual machine in a virtual environment. The virtual machine image is similar to a physical computer's disk volume, and may include a file system, the operating system and other components needed to boot up as a machine. In order to launch a virtual machine, hardware needs to be selected. The hardware selection may be accomplished through instance types, which may allow a variety of different sizes of memory, CPU capacity, I/O performance, and so forth. The combination of the virtual machine image and the instance type can be used to create an "instance" or a virtual machine, which may be launched on a cloud computing resource, such as a host server computer in a multi-tenant network environment.

As used herein, the term "compute service provider" can refer to a cloud provider capable of delivering computing and storage capacity as a service to one or more end recipients. The compute service provider can be established for an organization (i.e., a tenant) by, or on behalf of, the organization (that is, the compute service provider may offer a "private cloud environment"). In other instances, the compute service provider can support a multi-tenant environment, where a plurality of customers (i.e., tenants) operate independently (i.e., a public cloud environment). In this regard, the plurality of customers (e.g., multiple enterprises or tenants) can rent resources, such as server computers, within the multi-tenant environment.

As used herein, the term "service provider" may refer to a provider delivering one or more of the services associated with a private or public cloud environment to one or more end recipients. In some instances, the service provider may be the same as a cloud service provider. In other instances, the service provider may only provide a subset of the services provided by a compute service provider.

As used herein, the term "enterprise-based network" (or "enterprise private network" or "enterprise network" or "tenant private network) can refer to the network of computer systems that are owned by an enterprise (e.g., a corporation or another business). Typically, information access within the enterprise-based network is limited to employees of the company. In that sense, the enterprise network is a single-tenant system. However, data can be available to external users through an enterprise portal, such as a web interface. Typically, server computers in the enterprise network are not rentable by third parties. Additionally, the enterprise may be a tenant in a multi-tenant network (e.g., as provided by a compute service provider or a service provider).

Figure 1:
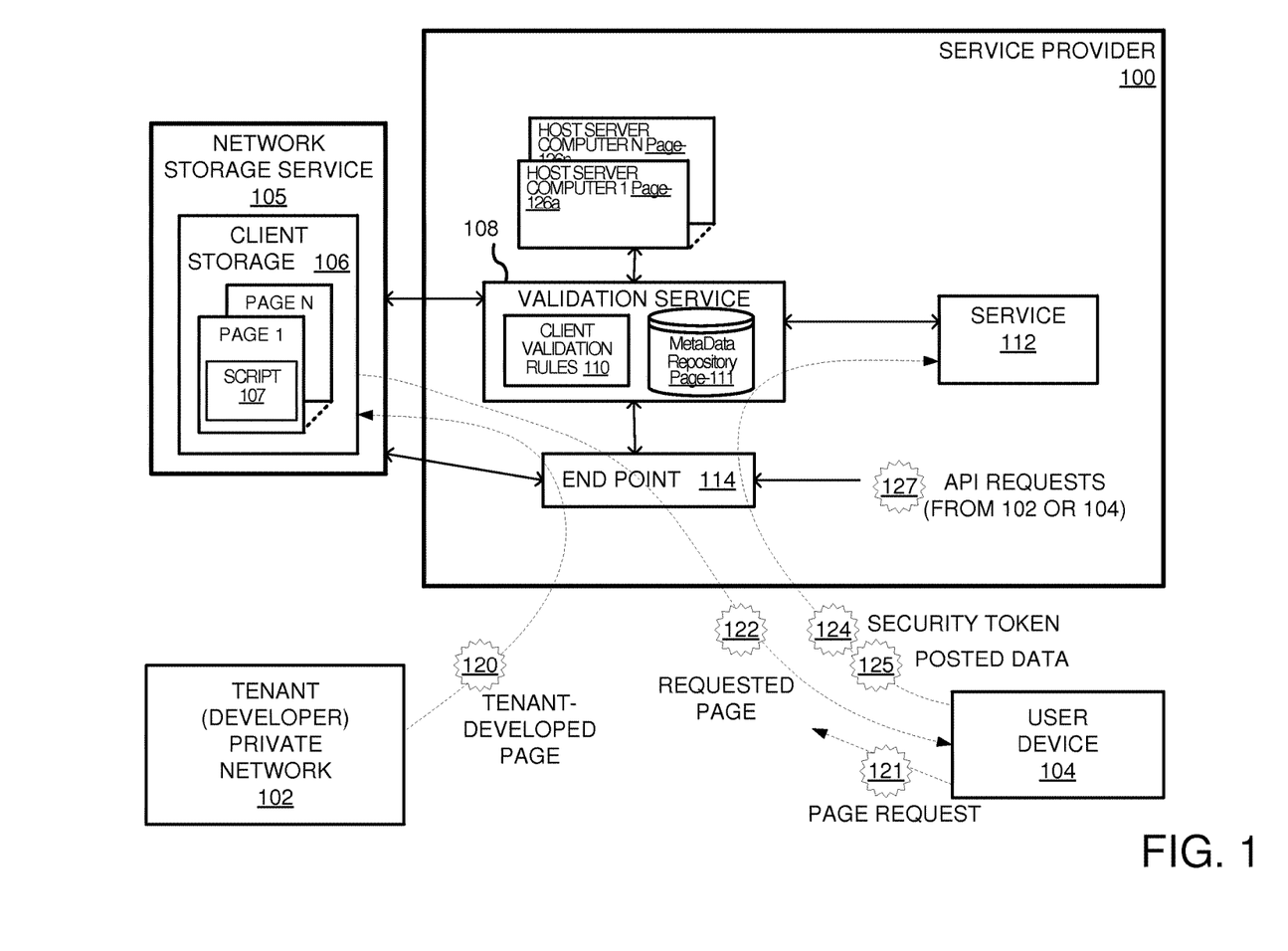
FIG. 1 is an embodiment of a system for validating data in a multi-tenant network of a service provider using a validation service, in accordance with an example embodiment of the disclosure.

FIG. 1 is an embodiment of a system for validating data in a multi-tenant network of a service provider using a validation service, in accordance with an example embodiment of the disclosure. Referring to FIG. 1, the service provider 100 may be a compute service provider (i.e., a cloud provider), capable of delivery of computing and/or storage capacity as a service to a community of end recipients (or tenants). Further details about the service provider 100 are disclosed herein in reference to FIGS. 4-5. The service provider 100 includes a plurality of host server computers 126a, ..., 126n, a validation service 108, and an end point 114. The service provider 100, the tenant private network 102, and/or the user device 104 may use a network storage service 105. In an example embodiment and as described further below, the network storage service 105 may be part of the service provider 100 so that the network storage service 105 and the validation service 108 can be services offered by the service provider 100, to which customers (e.g., one or more tenants at the tenant private network 102) can subscribe with payment of a fee.)

A host server computer (e.g., 126a) may comprise a CPU, memory, and storage, and may be configured to execute a hypervisor (or another type of program) configured to enable the execution of multiple virtual machine instances (VMIs) on each server computer on behalf of one or more tenants (e.g., tenant private network 102).

The end point 114 may comprise suitable circuitry, logic, and/or code and may include, for example a DNS address designed to receive and process API requests, such as API requests 127 from the tenant private network 102 or the user device 104. Particular API requests of interest are the API request from the user device 104 requesting a tenant-developed page (e.g., page 1 in storage 106) and API response from the user device 104 with data being proxied to the validation service 108.

Web services are commonly used in cloud computing. A web service is a software function provided at a network address over the web or the cloud. Clients initiate web service requests to servers and servers process the requests and return appropriate responses. The client web service requests are typically initiated using, for example, an API request. For purposes of simplicity, web service requests will be generally described herein as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service (e.g., the network storage service 105 or the validation service 108) receives the API request (e.g., via an end point) from a client device, the web service can generate a response to the request and send the response to the endpoint identified in the request.

The network storage service 105 may comprise suitable circuitry, logic, and/or code and may be operable to provide storage services (e.g., client storage 106) to one or more clients (or tenants) (e.g., tenant private network 102) of the service provider 100. In some instances, the network storage service 105 is a service that can store data in permanent storage (e.g., client storage 106 and/or service 112) in the form of objects. As is well understood in the art, in object-based storage, each object includes a data field (i.e., the main data), metadata associated with the object, and a globally unique identifier. The globally unique identifier may be stored separately in, for example, an index database (not illustrated in FIG. 1) for later requests.

The client storage 106 may be a dedicated storage used by the tenant private network 102 (e.g., provided by the service provider 100 for a fee) for storing one or more tenant-developed documents (e.g., pages 1, ..., N). Pages 1, ..., N may include a web-based and/or application-based process. More specifically, each page can be a user interface displayed by an application running on a computing device, or a web-page viewed by a browser, for example. Each one of the pages 1, ..., N can include content (such as images, video, and other data) and functionality (e.g., code or script, such as script 107, for implementing user interface controls, templates for displaying content, APIs, and other features as discussed herein).

The validation service 108 may comprise suitable circuitry, logic, and/or code and may be operable to provide data validation services within the network environment of the service provider 100. The validation service 108 may comprise client rules 110 and a metadata repository 111. The client rules 110 may be associated with one or more clients (or tenants) of the service provider 100 (e.g., each client/tenant may use separate client rules 110, or the client rules 110 may be used for a plurality of tenants). The client rules 110 may specify one or more rules for validating data (additional description of 110 is provided herein below in reference to FIG. 2). The metadata repository 111 may comprise suitable circuitry, logic, and/or code and may include validation logic for different types of form fields, which may be used in tenant-developed pages (e.g., page 1, ..., N in client storage 106). The metadata repository 111 may include validation logic that is "global" (i.e., applies to all or some tenants of the service provider 100) or "custom" (i.e., applies to one or more specific tenants). In this regard, the custom validation logic within the metadata repository 111 may be specified/updated by the corresponding one or more tenants.

The service 112 may be a database service or any other storage or processing service provided by the service provider 100. The network storage service 105 may optionally include the service 112, or the service 112 may be implemented separate from the network storage service 105 (as illustrated in FIG. 1). The service 112 may be used to store received data (e.g., if the service 112 is a database and data received from the user device 104 after it has been validated by the validation service 108) or the service 112 may be used to perform any other functionality (e.g., post-processing) of the validated data.

The tenant private network 102 may be a remote client network, such as an enterprise-based network. The tenant network 102 may include, for example, a plurality of host server computers configured to run one or more VMIs. One or more tenants of the service provider 100 may use the tenant private network 102.

In operation, a tenant-developed page 120 (e.g., a form with fields used for entering data) may be stored by a tenant using the tenant private network 102 in the client storage 106 (e.g., the tenant-developed page 120 may be stored as page 1 in client storage 106). The validation service 108 may then parse through page 1 (e.g., parse through the script 107 within page 1) and codify the client rules 110, which will be used to validate any data entered at the user device 104 and received for validation by the end point 114.

In an example embodiment, one or more of the pages stored in client storage 106 may be independently addressable by, e.g., a uniform resource locator (URL). For example, a user (e.g., a client of the tenant private network 102, such as a user of the user device 104) may send a page request 121 requesting page 1 from client storage 106. The user may enter a URL in the user device 104, where one portion of the URL may point to a location of the client storage 106, and another portion of the URL may point to the requested page 1. The user device 104 may then generate an http "get" request 121 based on the entered URL, and the request may be received by the end point 114 and routed to the client storage 106. In this regard, the pages stored in client storage 106 may be independently addressable via a user device 104, without the use of an intermediate tenant-controlled web server between the end point 114 and the network storage service 105.

The requested page 122 (i.e., page 1) may then be served to the user device 104. A user at the user device 104 may enter data in connection with the received page 122 (e.g., page 122 may be a form and the user may enter data to complete one or more data fields in the form). The script 107 within the page 122 may be used to generate an API for sending the posted (or entered) data 125 to the service 112. In this regard, the posted data 125 may be communicated to the service provider 100 and may be received by the end point 114. The posted data 125 may be communicated together with a security token 124. The security token 124 may include one or more secure keys associated with the tenant that has developed the page 122 (i.e., a tenant at the tenant private network 102). The security token 124 may be part of the page 122 (e.g., part of the script 107) when the page was created and stored in client storage 106 by the tenant private network 102. Subsequently, after the page 122 is served to the user device 104, the API for sending the posted data 125 may also send the security token 124 to the service provider 100. In an example embodiment, the script 107 may be used to validate data, at the user device 104, while such data is being entered in connection with the received page 122.

After the end point 114 receives the data 125 and the security token 124 identifying the tenant that created (or stored) the page, the end point may proxy the data and the token to the validation service 108 before any data is stored in the service 112. The validation service 108 may use the security token 124 to verify that the tenant associated with client storage 106 and the pages stored therein has rights/authorization to use the network storage service 105 and the validation service 108. The validation service 108 may then access client rules 110, which may be associated with the tenant identified by the security token 124.

After the validation service confirms the tenant associated with the security token 124 is authorized by the service provider 100 to use services 105 and 108, the validation service validates the received data 125 using the validation rules 110. After the data is successfully validated, the data 125 may be stored at the service 112 (and/or at another storage managed by the network storage service 105). In instances when the data 125 is not validated correctly, a notification may be provided to the user device 104 and/or to the tenant private network 102 that the posted data 125 has failed validation and will not be stored in the service 112.

Figure 2:
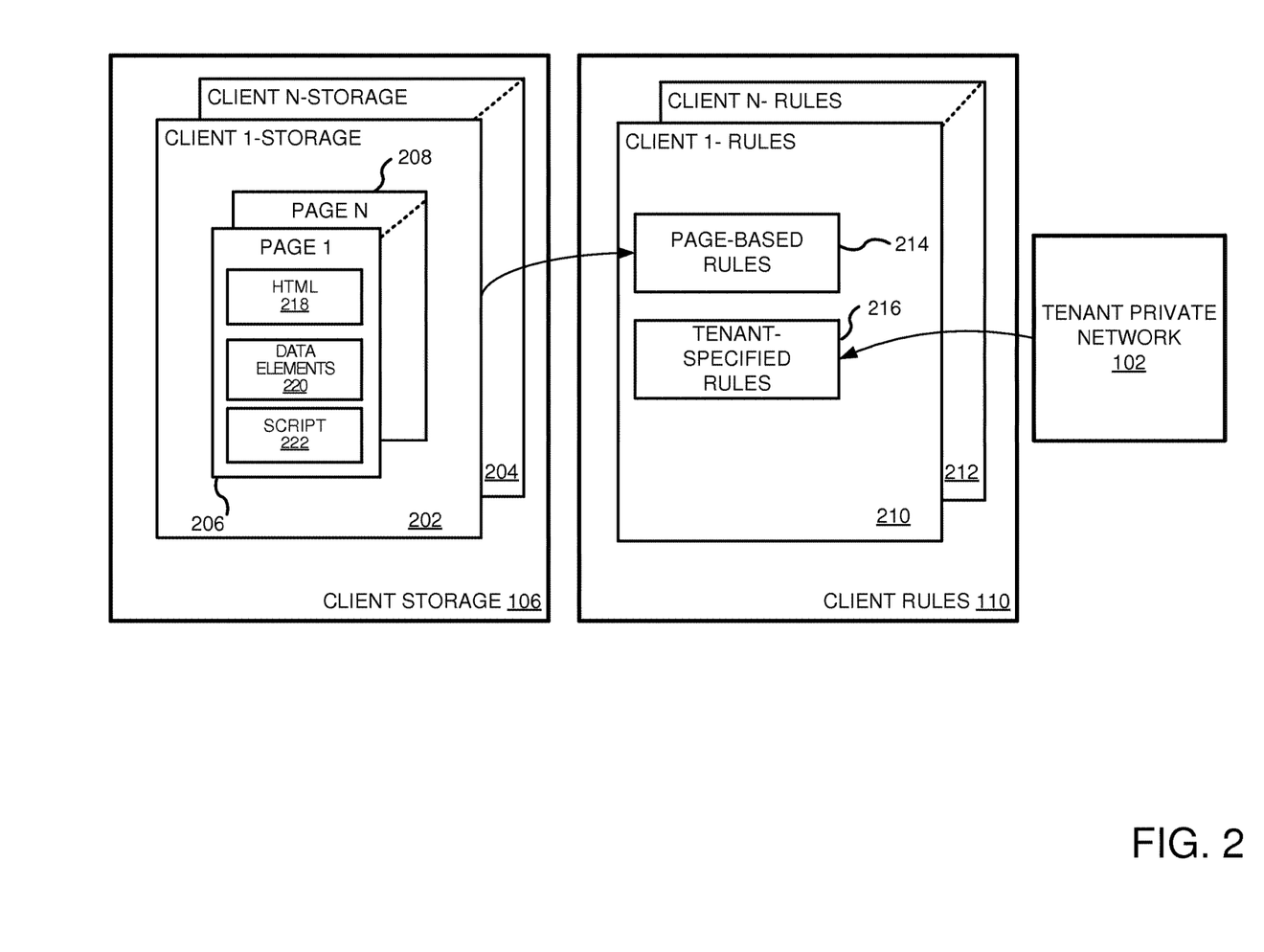
FIG. 2 is a block diagram illustrating generation of client validation rules used by the validation service of FIG. 1, in accordance with an example embodiment of the disclosure.

FIG. 2 is a block diagram illustrating generation of client validation rules used by the validation service of FIG. 1, in accordance with an example embodiment of the disclosure. Referring to FIG. 2, the client storage 106 may be operable to maintain a plurality of client storage blocks 202, . . . , 204 for clients 1, . . . , N, respectively. Each client storage, may be used by one or more tenants of the service provider 100 to store a plurality of pages (e.g., pages 206 . . . , 208 stored in client storage 202 for client/tenant 1). Each page (e.g., 206) may comprise code, such as HTML code 218, one or more data elements 220, and/or script 222 (page 206 and script 222 may have functionalities similar to page 1 and script 107 in FIG. 1).

The client rules 110 may include a plurality of rules 210, . . . , 212 associated with corresponding clients (or tenants) 1, . . . , N, respectively. Each set of client rules 210, . . . , 212 may be used for validating data that has been entered (e.g., by a user at the user device 104) in connection with a page associated with a corresponding client/tenant and stored in the client's storage. For example, client rules 210 may be used for validating data received in connection with one or more of pages 206, . . . , 208 stored in client storage 202 for client 1.

At least a portion of the client rules 210 (e.g., page-based rules 214) may be based on the client's page (e.g., 206). As explained in reference to FIG. 1, after the page 206 is stored in client storage 202, the validation service 108 parses through the HTML code 218, the data elements 220, and/or the script 222 to detect any data fields and to generate corresponding validation rules for such data fields. At least a second portion of the client rules 210 (e.g., rules 216) may be specified by the tenant within the tenant private network 102. For example, the tenant-specified rules 216 may be general (or global) rules that apply to one or more categories of data (e.g., format or restrictions for certain types of personal data, use of prohibited terms, valid numerical ranges such as for year of birth, and so forth). Additionally, the individual client rules 210, . . . , 212 within the client rules block 110 may each be associated with a profile of the corresponding client 1, . . . , N, and may be accessed based on security/authorization credentials for the client (e.g., security token 124).

Figure 3:
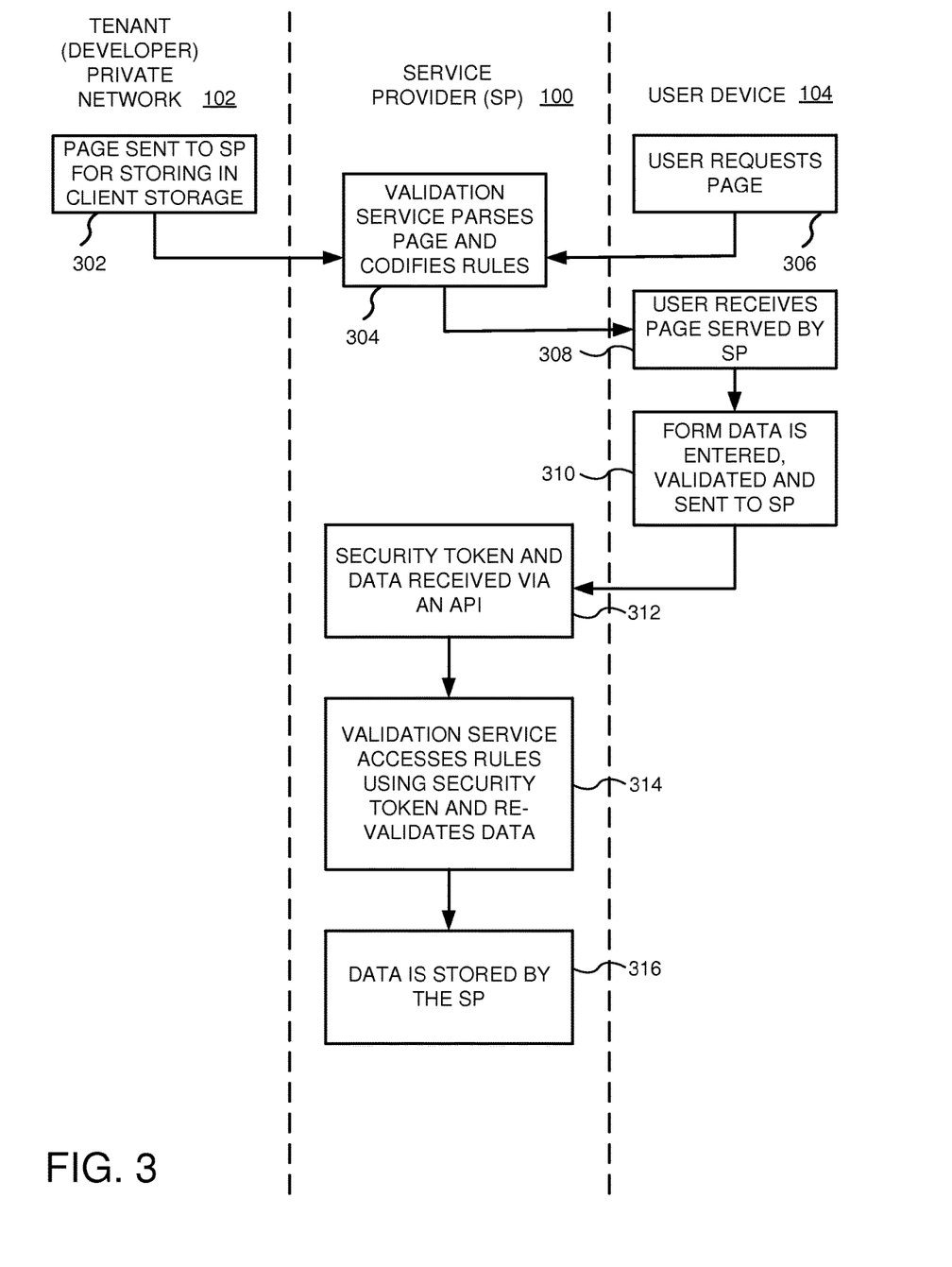
FIG. 3 is a flow diagram illustrating example steps used for requesting a page and validating form data, in accordance with an example embodiment of the disclosure.

FIG. 3 is a flow diagram illustrating example steps used for requesting a page and validating form data, in accordance with an example embodiment of the disclosure. Referring to FIGS. 1-3, at 302, a tenant (e.g., a developer) at the tenant private network 102 may send a page (e.g., page 206) for storing at the client storage 202. At 304, the validation service 108 of the service provider 100 may parse through the page 206 (e.g., the script 222) and may codify one or more of the client validation rules 210 (e.g., the page-based rules 214 may be generated or updated). At 306, a user at the user device 104 may request the page 202. For example, the user may enter a URL, which may identify the client storage 202 as well as the page 206 (i.e., the page 206 can be addressed directly without the use of an intermediate tenant-controlled web or application server).

At 308, the page 206 may be served to the user and the user may receive the page at the user device 104. At 310, form data may be entered in connection with the received page (e.g., if the page is a form, form data may be entered at the user device 104). As data is entered in the page, the script 222 may be used to perform data validation at the user device 104. After the data is entered and validated at the device 104, the data (e.g., 125) and a security token (e.g., 124) associated with the tenant storing the page in client storage 202. At 312, the security token 124 and the posted/entered data 125 may be sent to the service provider 100 via an API generated based on the script 222. The end point 114 may validate the tenant associated with token 124 (e.g., may verify the tenant may use the validation service 108), and may communicate the received data 125 and security token 124 to the validation service 108. AT 314, the validation service 108 may use the security token 124 to access the client rules 210 associated with the tenant (i.e., client 1). The validation service 108 may then re-validate the data 125 using the client rules 210. Upon successful validation of the data, the data may be stored in service 112.

Figure 4:
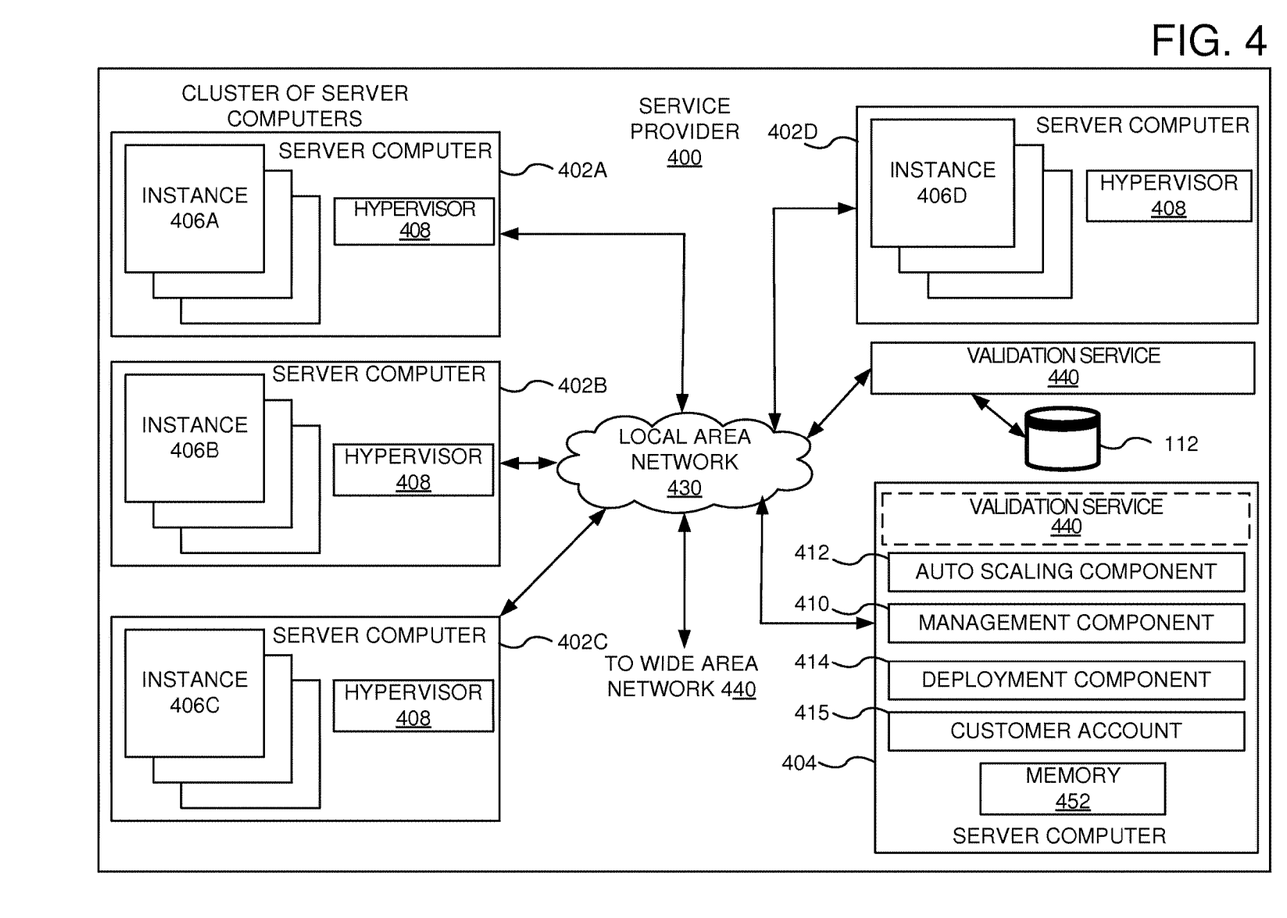
FIG. 4 is an example system diagram showing a plurality of virtual machine instances running in a multi-tenant environment, in which a validation service can be executed, in accordance with an example embodiment of the disclosure.

FIG. 4 is an example system diagram showing a plurality of virtual machine instances running in a multi-tenant environment, in which a validation service can be executed, in accordance with an example embodiment of the disclosure. More specifically, FIG. 4 is a computing system diagram of a network-based service provider 400 that illustrates one environment in which embodiments described herein can be used. By way of background, the service provider 400 (i.e., the cloud provider) is capable of delivery of computing and storage capacity as a service to a community of end recipients (e.g., tenants or customers).

In an example embodiment, the service provider 400 can be established for an organization by or on behalf of the organization. That is, the service provider 400 may offer a "private cloud environment." In another embodiment, the service provider 400 supports a multi-tenant environment, wherein a plurality of customers operate independently (i.e., a public cloud environment). In this regard, the plurality of customers (e.g., multiple enterprises) can rent resources, such as server computers, within the multi-tenant environment.

Generally speaking, the service provider 400 can provide the following models: Infrastructure as a Service ("IaaS"), Platform as a Service ("PaaS"), and/or Software as a Service ("SaaS"). Other models can be provided. For the IaaS model, the service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the service provider 400 using networked customer devices, such as desktop computers, laptops, tablets, smartphones, etc. running web browsers or other lightweight customer applications. Those skilled in the art will recognize that the compute service provider 400 can be described as a "cloud" environment.

The particular illustrated service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e., a computer) that executes applications like a physical machine. In the example, each of the server computers 402A-402D can be configured to execute a hypervisor 408 or another type of program configured to enable the execution of multiple instances 406 on a single server. For example, each of the servers 402A-402D can be configured (e.g., via the hypervisor 408) to support one or more virtual machine partitions, with each virtual machine partition capable of running a virtual machine instance (e.g., server computer 402A could be configured to support three virtual machine partitions each running a corresponding virtual machine instance). Additionally, each of the instances 406 can be configured to execute one or more applications.

Figure 5:
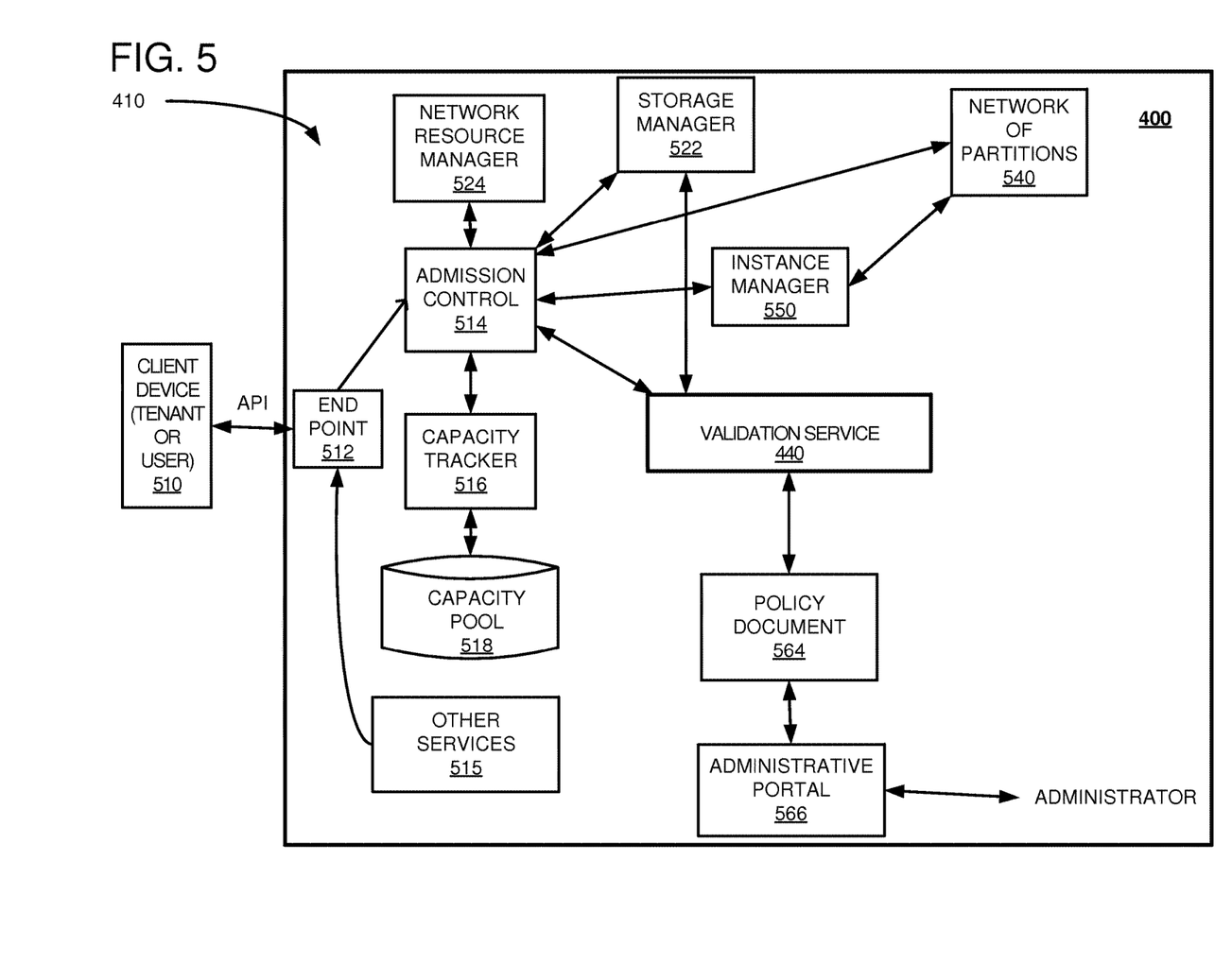
FIG. 5 shows further details of an example system including a plurality of management components associated with a control plane, in which the validation service can be located.

The service provider 400 may also comprise a validation service 440. The validation service 440 may comprise suitable circuitry, logic, and/or code and may be operable to perform the functionalities described herein (e.g., similar to the functionalities of the validation service 108 described in reference to FIGS. 1-3) including parsing stored pages/documents and generating validation rules based on the parsed document/page, access validation rules (e.g., in a tenant profile or tenant storage based on security/authorization information of the tenant), validate data posted in a document/page of the tenant based on the tenant validation rules, and so forth. The validation service 440 may be implemented as a stand-alone service within the provider 400, as a dedicated server (similar to the servers 402A-402D), and/or may be implemented as part of the server computer 404 that performs management functions (or as part of the individual server computers 402A-402D). For example, the validation service 440 may be implemented as a software application running on the server's operation system (e.g., as part of the management component 410 (as seen in FIG. 5)).

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

The server computers 404 can perform management functions and can be reserved for executing software components for managing the operation of the server computers 402, the instances 406, the hypervisors 408, and/or the application migration service 440. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component 410 can further include a policy document (e.g., 564 in FIG. 5) to implement customer/tenant policies, such as policies related to the validation service 440. In some instances, the policy document 564 for a customer/tenant may include the validation rules associated with such customer/tenant (e.g., the client rules stored in client storage 106).

The server computer 404 may further comprise memory 452, which may be used as processing memory by the validation service 440. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager (e.g., 550 in FIG. 5) can be considered part of the deployment component 414.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, and so forth.

A network 430 can be utilized to interconnect the server computers 402A-402D and the server computer 404. The network 430 can be a local area network (LAN) and can be connected to a Wide Area Network (WAN) 440 so that end-users can access the compute service provider 400. It should be appreciated that the network topology illustrated in FIG. 4 has been simplified and that many more networks and networking devices can be utilized to interconnect the various computing systems disclosed herein.

FIG. 5 shows further details of an example system including a plurality of management components associated with a control plane, in which the validation service can be located. More specifically, FIG. 5 illustrates in further detail the management component 410, which may implement the validation service 440 within the multi-tenant environment of the service provider 400 (which can be the same as the service provider 100).

In order to access and utilize instances (such as instances 406 of FIG. 4), a client device 510 can be used. The client device 510 can be any of a variety of computing devices, mobile or otherwise, including a cell phone, smartphone, handheld computer, Personal Digital Assistant (PDA), desktop computer, and so forth, used by a tenant at the tenant private network 102 or by a user (e.g., a customer of the tenant). The client device 510 can communicate with the service provider 400 through an end point 512, which can be a DNS address designed to receive and process application programming interface (API) requests. In particular, the end point 512 can be a web server configured to expose an API (the end point 512 may have functionalities that are similar to those performed by the end point 114). Using the API requests, the client device 510 can make requests to implement any of the functionalities described herein (e.g., page request 121 for requesting a page from the network storage service 105, posting data 125 and security token 124 to the service provider 100 for validation, and so forth, as described in reference to FIG. 1). Other services 515, which can be internal to the service provider 400, can likewise make API requests to the end point 512. The API requests from the client device 510 can pass through the admission control 514 and onto the validation service 440 in order to access the policy document 564 (e.g., to access client validation rules) and/or to request validation-related services.

An administrative portal 566 can be used to access and make changes to the policy document 564 by an administrator of either the tenant or the service provider 400. The policy document 564 may specify, for example, global validation rules that are valid for all tenants and/or custom tenant validation rules that are valid for a specific tenant (e.g., one or more of the tenant-specific validation rules 210, . . . , 212). A tenant may be provided access to the administrative portal 566 to enter tenant-specified validation rules (e.g., 216) into the tenant's validation rules (e.g., 210).

Other general management services that may or may not be included in the service provider 400 (and/or within the management component 410) include an admission control 514, e.g., one or more computers operating together as an admission control web service. The admission control 514 can authenticate, validate and unpack the API requests for service or storage of data within the service provider 400. The capacity tracker 516 is responsible for determining how the servers need to be configured in order to meet the need for the different instance types by managing and configuring physical inventory in terms of forecasting, provisioning, and real-time configuration and allocation of capacity. The capacity tracker 516 maintains a pool of available inventory in a capacity pool database 518. The capacity tracker 516 can also monitor capacity levels so as to know whether resources are readily available or limited.

An instance manager 550 controls launching and termination of virtual machine instances in the network. When an instruction is received (such as through an API request) to launch an instance, the instance manager 550 pulls resources from the capacity pool 518 and launches the instance on a decided upon host server computer using the network of partitions 540. Similar to the instance manager are the storage manager 522 and the network resource manager 524. The storage manager 522 relates to initiation and termination of storage volumes (i.e., managing of the network storage service 105), while the network resource manager 524 relates to initiation and termination of routers, switches, subnets, etc.

The validation service 440 may perform the data validation functionalities described herein (e.g., as described in reference to the validation service 108. The validation service 440 may communicate with the admission control 514 for purposes of receiving communications such as posted data 125 and a security token 124 from the user device 104. Communication with the storage manager may be used to obtain/update client validation rules and/or store validated data in a database (e.g., 112) or another storage managed by the network storage service 105.

Figure 6:
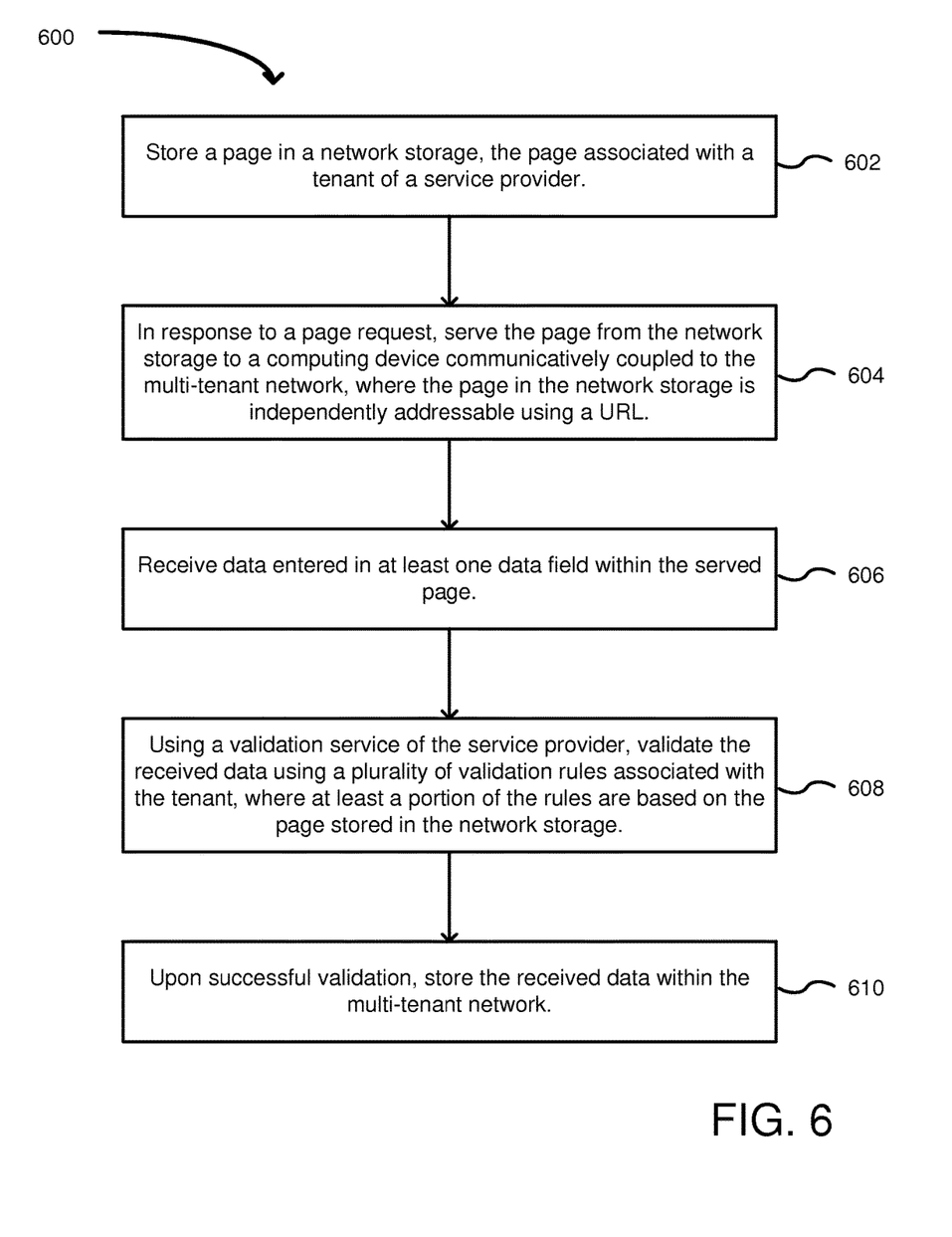
FIG. 6 is a flowchart of an example method of validating data in a multi-tenant network of a service provider, in accordance with an embodiment of the disclosure.

FIG. 6 is a flowchart of an example method of validating data in a multi-tenant network of a service provider, in accordance with an embodiment of the disclosure. Referring to FIGS. 1-2 and 6, the example method 600 may start at 602, when a tenant of the service provider 100 at the tenant private network 102 may store a page (e.g., 206) in a network storage (e.g., 202 within client storage 106). The page may be associated with the tenant of the service provider 100 (i.e., may be created/developed by the tenant). AT 604, in response to a page request 121 from a user at the user device 104, the page 206 may be served from the network storage (client storage 202 which is part of client storage 106 in the network storage service 105) to the user device 104 communicatively coupled to the multi-tenant network of the service provider 100. The page 206 in the network storage (202) may be independently addressable using a uniform resource locator (URL).

At 606, data (e.g., 125) entered in at least one data field within the served page may be received by the end point 114. For example, the data 125 may be received using at least one application programming interface (API) based on the script 222 within the served page 206. At 608, the validation service 108 of the service provider 100 may validate the data using a plurality of validation rules (e.g., 210) associated with the tenant. At least a portion of the plurality of validation rules (e.g., page-based rules 214) are based on the page stored in the network storage. More specifically, the page-based rules 214 are generated based on parsing the page after it has been stored in the client storage 202). AT 610, after the data has been successfully validated, it may be stored within the multi-tenant network of the service provider 100 (e.g., within the service 112).

The page request 121 may be received using the URL. The network storage (e.g., 106) may be an object-based storage, and the URL may identify a storage location within the object-based storage and an object stored in the storage location. The object may correspond to the requested page. The stored page 206 may be parsed to generate the at least a portion of the plurality of validation rules (i.e., the page-based rules 214). The plurality of validation rules (e.g., 210) may be associated with a customer profile of the tenant in the multi-tenant network. At least another portion of the plurality of validation rules (e.g., 216) may be specified by the tenant.

The page 206 may comprises a web browser-based process (i.e., the page may be a web page) or an application-based process. More specifically, the page 206 can be a user interface displayed by an application running on a computing device, or a web-page viewed by a browser, for example. Page 206 can include content or data elements 220 (such as images, video, and other data elements) and functionality (e.g., code or script, such as HTML code 218 and script 222, which may be used for implementing user interface controls, templates for displaying content, APIs, and other features as discussed herein).

Figure 7:
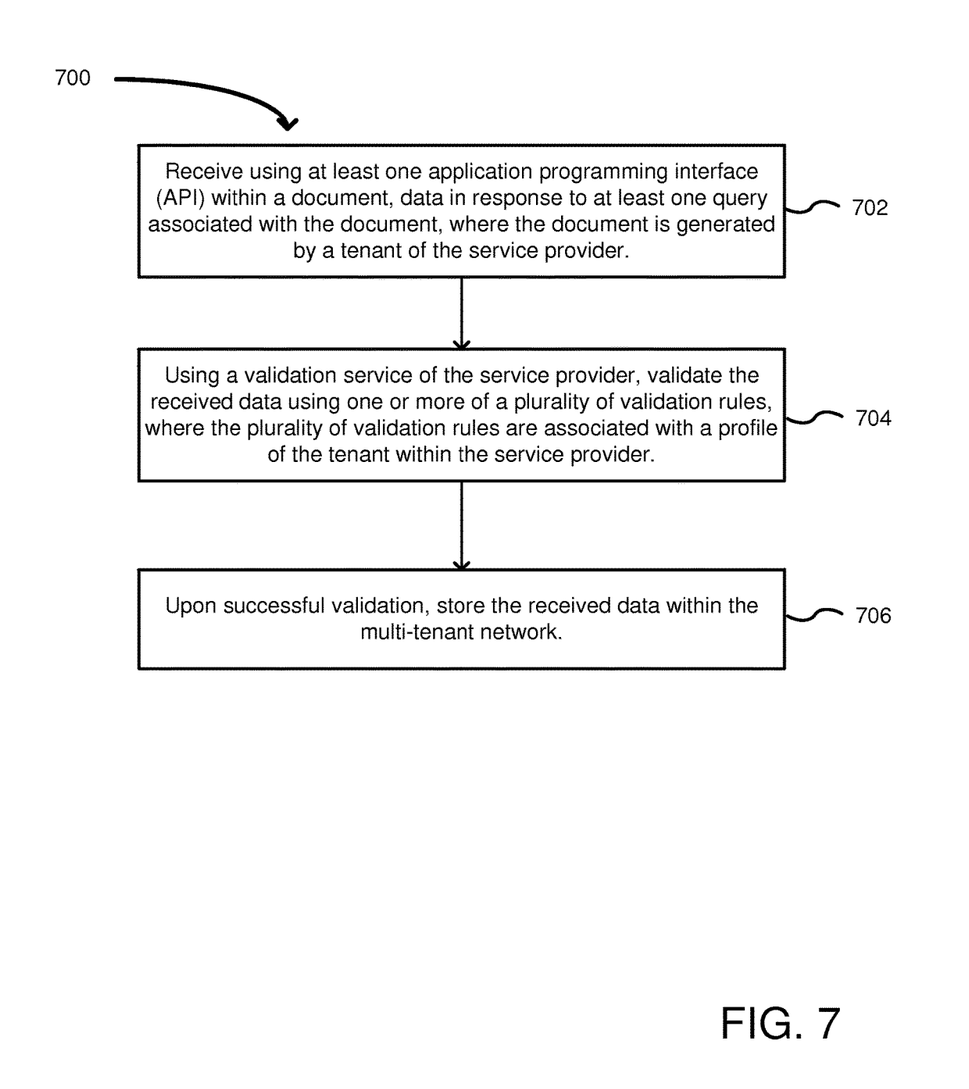
FIG. 7 is a flowchart of another example method of validating data in a multi-tenant network of a service provider, in accordance with an embodiment of the disclosure.

FIG. 7 is a flowchart of another example method of validating data in a multi-tenant network of a service provider, in accordance with an embodiment of the disclosure. Referring to FIGS. 1-2 and 7, the example method 700 may start at 702, when data (e.g., 125) may be received using at least one application programming interface (API) within a document (e.g., an API may be generated based on the script 222 within page 206). The data 125 may be posted/entered by a user of the user device 104 in response to at least one query associated with the document (e.g., page 206 may be a form, which may be filled out by the user). The document (e.g., page 206) may be generated by a tenant of the service provider (e.g., a tenant within the tenant private network 102). At 704, the received data 125 may be validated by the validation service 108 of the service provider 100, using one or more of a plurality of validation rules (e.g., client rules 210). The plurality of validation rules (210) may be associated with a profile of the tenant within the service provider 100. At 706, after the data 125 has been successfully validated by the validation service 108, the validated data may be stored within the multi-tenant network (e.g., within the service 112).

Figure 8:
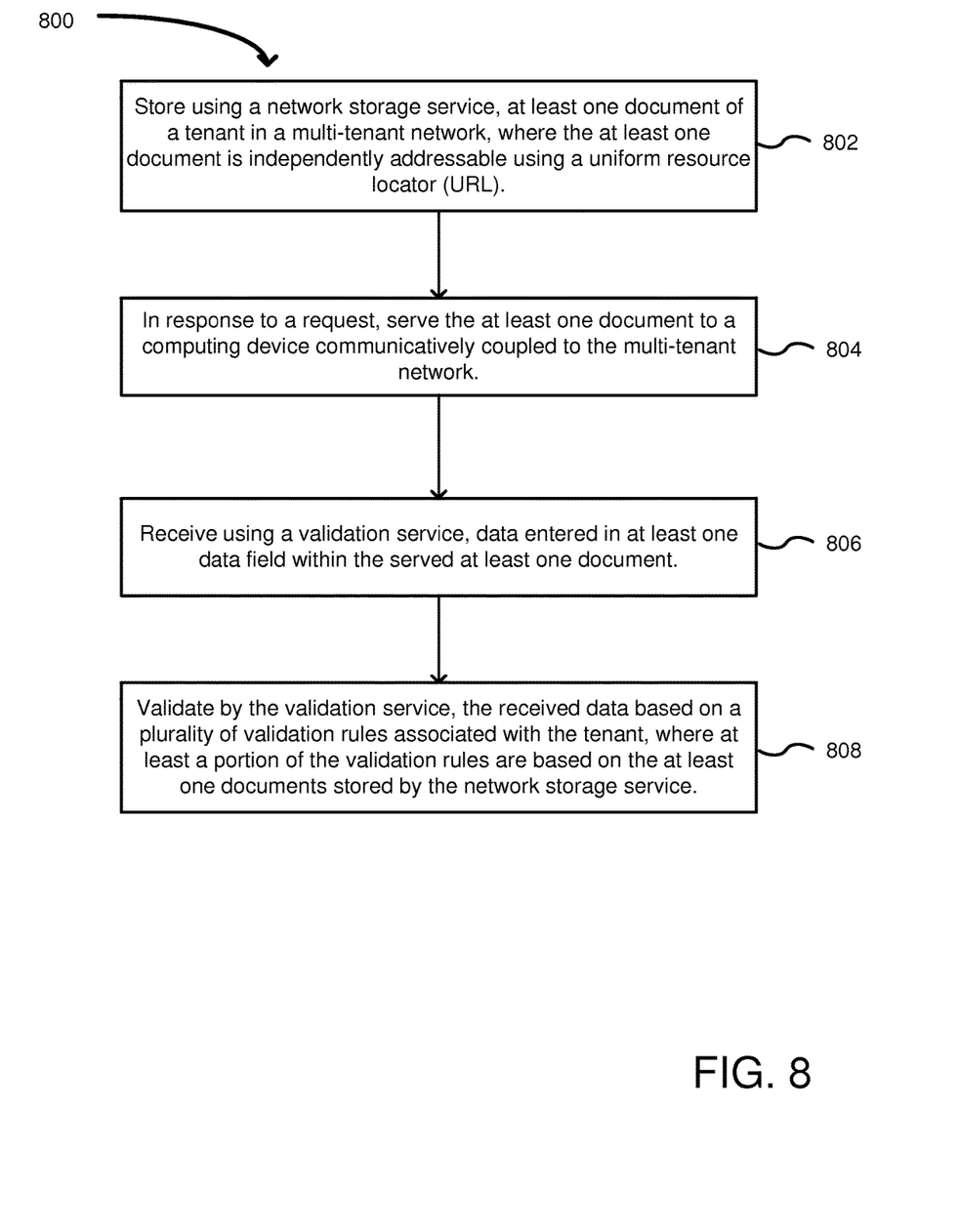
FIG. 8 is a flowchart of yet another example method of validating data in a multi-tenant network of a service provider, in accordance with an embodiment of the disclosure.

FIG. 8 is a flowchart of yet another example method of validating data in a multi-tenant network of a service provider, in accordance with an embodiment of the disclosure. Referring to FIGS. 1-2 and 8, the example method 800 may start at 802 when a tenant of the service provider 100 may use a network storage service (105) to store at least one document of the tenant (e.g., page 206). The at least one document (e.g., page 206) may be independently addressable using a uniform resource locator (URL). At 804, the network storage service may receive (via an API request sent to the end point 114) the page request 121. In response to the request 121, the network storage service 105 may serve the at least one document (e.g., page 206) to a computing device communicatively coupled to the multi-tenant network (e.g., user device 104).

At 806, the validation service 108 may receive (e.g., via an API response sent to the end point 114) data entered in at least one data field within the served at least one document. For example, the posted data 125 and the security token 124 may be sent via an API (e.g., an API based on the script 222 within the page 206) to the end point 114. After the tenant is identified and use of the validation service by the identified tenant is confirmed (e.g., by using the security token 124), the posted data 125 and the security token 124 may be sent to the validation service 108. At 808, the validation service 108 may validate the received data using a plurality of validation rules (e.g., client rules 210) associated with the tenant. At least a portion of the plurality of validation rules are based on the at least one documents stored by the network storage service. For example, the page-based rules 214 may be extracted by parsing the page 206 (e.g., parsing the script 222 within the page 206). Upon successful validation, the validation service 108 may communicate the validated data to the service 112 for storing (e.g., if the service 112 is a database service) or for any other post-processing within the multi-tenant network.

Figure 9:
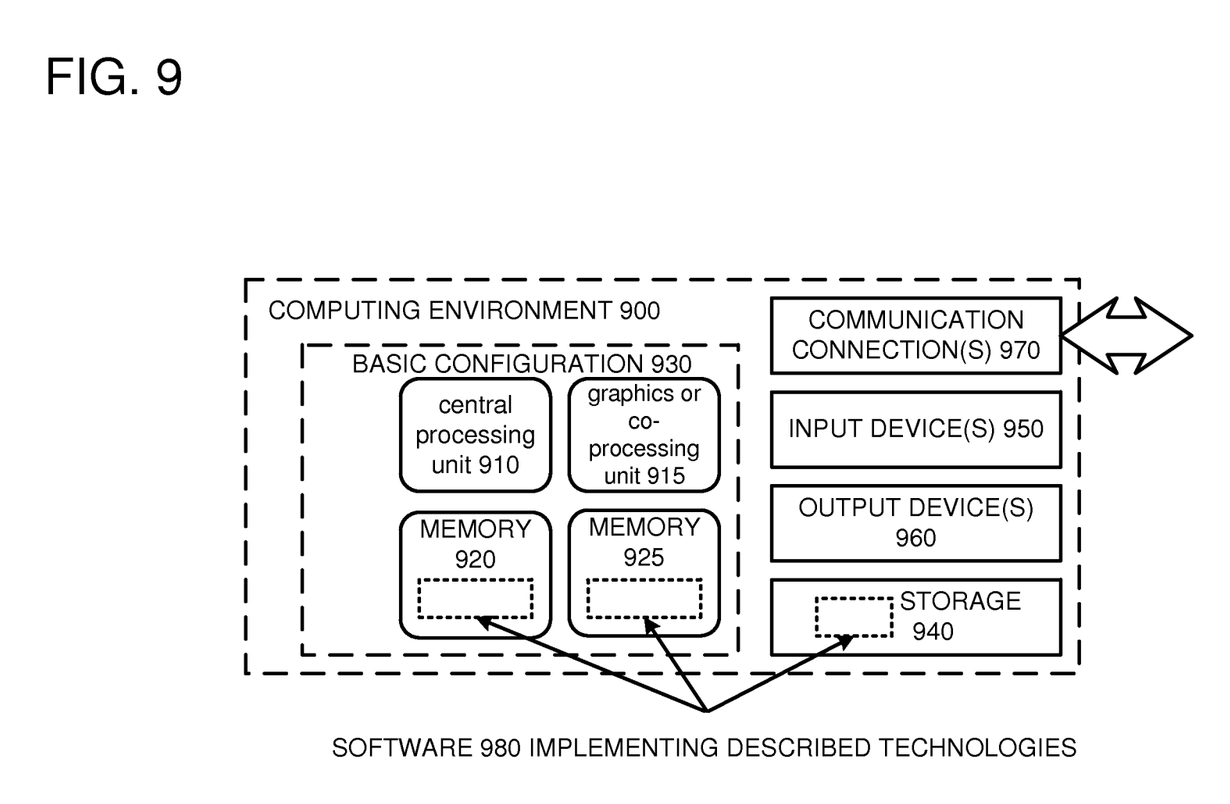
FIG. 9 depicts a generalized example of a suitable computing environment in which the described innovations may be implemented.

FIG. 9 depicts a generalized example of a suitable computing environment in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.)

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of validating data in a multi-tenant network of a service provider cloud service environment, the method comprising, within the cloud service environment:
storing a page in a network storage, the page being associated with a tenant of the service provider, the page further comprising at least a page script and at least one data field;
parsing the page, including at least a portion of the page script;
determining at least one validation rule that is applicable to validating page data, the validation rule being based at least in part on the portion of the page script;
in response to a page request from a user computing device, serving the page from the network storage to the user computing device communicatively coupled to the cloud service environment;
receiving data entered into the at least one data field within the page from the user computing device, wherein the received data has undergone a first validation on at least a portion of data field data in accordance with at least one constraint set forth in the page script on the user computing device;
performing a second validation based on the at least one validation rule; and
upon successful first and second validations, storing the received data within the cloud service environment.

2. The method according to claim 1, comprising:
receiving the page request using a uniform resource locator (URL), wherein:
the network storage is an object-based storage; and
the URL identifies a storage location within the object-based storage and an object stored in the storage location, the object corresponding to the requested page.

3. The method according to claim 1, comprising:
parsing the stored page to generate a plurality of validation rules, wherein the at least one validation rule is associated with a customer profile of the tenant in the cloud service environment.

4. The method according to claim 1, comprising:
parsing the page to generate a plurality of validation rules, wherein the at least one validation rule is specified by the tenant.

5. The method according to claim 1, wherein the page comprises a web browser-based process or an application-based process.

6. The method according to claim 1
wherein receiving the data comprises using at least one application programming interface (API) based on the page script.

7. The method according to claim 1, comprising:
parsing the stored page to generate a plurality of validation rules, wherein the at least one validation rule is associated with the service cloud service environment.

8. The method according to claim 1, comprising:
parsing the stored page to generate a plurality of validation rules, wherein the at least one validation rule applies to a plurality of tenants.

9. A non-transitory computer-readable storage medium including instructions that upon execution cause a computer system to:
receive a document provided by a tenant of a service provider, the document comprising at least a page script and at least one data field;
parse the document, including at least a portion of the page script;
determine at least one validation rule in accordance with the page script stored in the document;
serve the document to a user computing device in response to a page request to a service provider, the user device communicatively coupled to the service provider;
receive, via at least one application programming interface (API) within the document, data in response to at least one query associated with the document, wherein the data was entered into the document using the user computing device, and wherein the received data has undergone a first validation on the user computing device based on at least a portion of a script within the document;
perform a second validation of the received data using the at least one validation rule; and
upon successful validation, store the received data.

10. The non-transitory computer-readable storage medium of claim 9, wherein the instructions, upon execution, further cause the computer system to:
store the document in a network storage of a cloud service environment, wherein the network storage is associated with the tenant and is independently addressable using a uniform resource locator (URL).

11. The non-transitory computer-readable storage medium of claim 10, wherein:
the network storage is an object-based storage; and
each object within the object-based storage includes a data field, metadata associated with the object and a globally unique identifier.

12. The non-transitory computer-readable storage medium of claim 10, wherein the instructions, upon execution, further cause the computer system to:
in response to receiving a query at an IP address corresponding to the URL, serve the stored document from the network storage to a computing device communicatively coupled to the multi-tenant network, wherein the serving bypasses the use of a tenant-controlled web server.

13. The non-transitory computer-readable storage medium of claim 9, wherein the data comprises a security token associated with the tenant and wherein the instructions, upon execution, further cause the computer system to:
authorize use of a service to validate the data based on the token.

14. The non-transitory computer-readable storage medium of claim 13, wherein the instructions, upon execution, further cause the computer system to:
upon identifying the tenant based on the security token, access the plurality of validation rules from the profile of the tenant.

15. A system for validating data in a multi-tenant network of a service provider cloud service environment, the system comprising:
a plurality of host server computers coupled together to form the cloud service environment, at least a portion of the host server computers executing a plurality of virtual machines associated with a customer account of a tenant;
a network storage operable to:
store at least one document of the tenant, wherein the at least one document is independently addressable using a uniform resource locator (URL) and contains at least a portion of document script and at least one data field; and in response to a request, serve the at least one document to a user computing device communicatively coupled to cloud service environment; and a validation routine operable to:

generate a plurality of validation rules associated with the tenant, the generating based at least in part on parsing the at least a portion of document script of the at least one document stored in the network storage;

receive data entered into the at least one data field within the served at least one document, the data having been entered into the at least one data field using the user computing device; and secondarily validate the received data using the plurality of validation rules associated with the tenant, the second validation occurring within one of the plurality of host server computers within the multi-tenant network; and upon successful validation first and second validations, storing the received data within the multi-tenant network, wherein the portion of the document script in the at least one document is configured to perform an initial data first validation check on the at least one data field data entered during data entry at the user computing device, the initial data first validation occurring prior to the subsequent second validation performed in the cloud service environment.

16. The system according to claim 15, further comprising:

an end point operable to:

receive and forward the request to the network storage service without the use of a tenant-controlled web server between the end point and the network storage service; and receive and forward the data entered in at least one data field within the served at least one document for validation in the cloud service environment.

17. The system according to claim 15, wherein the plurality of validation rules are associated with a customer profile of the tenant in the cloud service environment.

18. The system according to claim 17, wherein the validation routine is operable to:

receive input specifying at least another portion of the plurality of validation rules.

19. The system according to claim 15, wherein the validation routine is operable to:

receive a security token associated with the tenant; and access the plurality of validation rules associated with the tenant based on the security token.

* * * * *